(12) United States Patent
Mikan et al.

(10) Patent No.: US 9,480,044 B2
(45) Date of Patent: *Oct. 25, 2016

(54) CALL MANAGEMENT

(71) Applicant: AT&T Mobility II LLC, Atlanta, GA (US)

(72) Inventors: Jeffrey Mikan, Atlanta, GA (US); Justin McNamara, Dunwoody, GA (US); John Ervin Lewis, Lawrenceville, PA (US); Fulvio Arturo Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,506

(22) Filed: Aug. 16, 2013

(65) Prior Publication Data

US 2013/0337788 A1    Dec. 19, 2013

Related U.S. Application Data

(63) Continuation of application No. 12/342,602, filed on Dec. 23, 2008, now Pat. No. 8,526,406.

(51) Int. Cl.
| | |
|---|---|
| *H04W 68/00* | (2009.01) |
| *H04M 3/46* | (2006.01) |
| *H04W 4/16* | (2009.01) |
| *H04W 68/02* | (2009.01) |
| *H04W 84/04* | (2009.01) |

(52) U.S. Cl.
CPC .......... *H04W 68/005* (2013.01); *H04M 3/465* (2013.01); *H04W 4/16* (2013.01); *H04W 68/02* (2013.01); *H04W 84/045* (2013.01)

(58) Field of Classification Search
CPC ... H04W 72/12; H04W 68/005; H04W 4/16; H04W 68/02; H04W 84/045; H04M 3/465
USPC ............... 370/328, 329, 335, 338, 341, 342; 455/417, 445, 518, 519
See application file for complete search history.

(56) References Cited

U.S. PATENT DOCUMENTS

| | | | | |
|---|---|---|---|---|
| 6,141,556 | A * | 10/2000 | Dougherty et al. | 455/445 |
| 7,605,720 | B1 * | 10/2009 | Menzies et al. | 340/995.13 |
| 7,711,102 | B2 * | 5/2010 | Worsham et al. | 379/211.03 |
| 7,881,449 | B2 * | 2/2011 | Hanson et al. | 379/211.02 |
| 2002/0191595 | A1 * | 12/2002 | Mar et al. | 370/352 |
| 2007/0072626 | A1 | 3/2007 | Babu et al. | |
| 2008/0244148 | A1 | 10/2008 | Nix et al. | |
| 2009/0028318 | A1 | 1/2009 | Bhogal et al. | |
| 2009/0191845 | A1 | 7/2009 | Morgan et al. | |
| 2010/0159895 | A1 | 6/2010 | Wallis et al. | |

* cited by examiner

*Primary Examiner* — Christopher Grey
(74) *Attorney, Agent, or Firm* — Baker & Hostetler LLP

(57) ABSTRACT

When a call is received for a device within an area of coverage, all devices within the area of coverage are rung. The call may be connected to the first device that picks up. All devices may be rung at the same time or in a predetermined order. For example, the first device rung may be a device that was most recently moved, a device that was most recently active, based on a time of day, or the like.

20 Claims, 5 Drawing Sheets

CALL MANAGEMENT

CROSS-REFERENCE TO RELATED APPLICATIONS

The instant application is a continuation of, and claims priority to, U.S. patent application Ser. No. 12/342,602, filed Dec. 23, 2008. U.S. patent application Ser. No. 12/342,602 is hereby incorporated by reference herein in its entirety.

TECHNICAL FIELD

The technical field generally relates to wireless communications and more specifically relates to wireless communication via femtocells.

BACKGROUND

Communications devices such as cellular telephones, mobile communication devices, personal digital assistants (PDAs), laptops, and the like are becoming more prevalent as users appreciate the smaller form factors, increased functionality, and the mobility of the devices. It is not uncommon for a household to give up its land lines and use mobile devices exclusively. To that end, femtocells have been growing in popularity. Use of a femtocell can prevent dead zones with its area of coverage. A femtocell can be thought of as a small wireless base station having a limited area of coverage. Femtocells are typically designed for residential or small business use. Commonly, a femtocell acts as a connection to an Internet and as a wireless router to various wireless devices. Calls are connected to the devices via an approved wireless interface and the call is backhauled (communicated to a communications network) via the Internet. A problem with exclusively using wireless mobile devices, even via a femtocell, is that the device can be in a location other than the location of the user. For example, a device can be in one room of a house and the user can be in another room of the house. When a call comes in, if the user can hear the device "ringing," the user must hurry to the mobile device to answer it, possibly missing the call. Or, the user may not hear the device ringing, and miss the call.

SUMMARY

In an example configuration, when a call is received for a device within a femtocell area of coverage, all devices within the femtocell area of coverage are provided a notification of the call (e.g., all devices ring). As a device enters the femtocell area of coverage, it is detected by the femtocell, and the device's identifier, (e.g., MSISDN or the like), is maintained in a list. When a call comes in for any one of the devices, all devices on the list are sent a notification of the call. The call is connected, via the femtocell, to the first device to answer, e.g., respond, the call. The device that answers the call may, or may not, be the device to which the call was originally directed. The femtocell manages the call such that, to the communications network from which the call was sent, it appears as though the intended device has picked up the call. As a device exits the femtocell's area of coverage, its identifier is removed from the list.

In one example configuration, an indication of the call is provided to the devices in the femtocell's area of coverage in a predetermined order. In another example configuration, the indication of the call is provided first, to the device that has most recently been moved. In another example configuration, the indication of the call is provided first, to the device that has most recently been active (e.g., received call, placed call, etc.).

BRIEF DESCRIPTION OF THE DRAWINGS

The following description is better understood when read in conjunction with the appended drawings.

DESCRIPTION OF ILLUSTRATIVE EMBODIMENTS

In an example embodiment, a femtocell is configured to ring all mobile communications devices, concurrently, within its area of coverage when a calls comes in for any one device. This helps to alleviate the problem, when only a single device is rung, of missing a call if the user of the device is not close enough to the device when it rings. In various example embodiments, all devices are not rung concurrently, but are rung in a predetermined order. The order can be determined in accordance with the predetermined location (a region or zone within the femtocell area of coverage) of the devices within the femtocell area of coverage, in accordance with the devices themselves, or a combination thereof. For example, as described in more detail below, zones, such as rooms/areas of a house or office, can be assigned a priority value, and devices in the zones can be rung, consecutively, in priority value order. Or, as another example, devices can be assigned a priority value, and devices can be rung in the priority order. Thus, zones or devices that are expected to receive the most calls can be rung first, and as the expectance of calls decreases, the zone/device can be placed lower on the priority list.

The device to be rung first can be the highest device on the priority list, or can be determined in accordance with recent activity and/or movement associated with the device. For example, accelerometers on a device can be utilized to inform the femtocell of motion of the device. When a call comes in for any device in the femtocell area of coverage, the device that most recently indicated motion can be rung first. Or, the device that was most recently active (e.g., received call, sent call, etc.) can be the first device to be rung.

When a device "answers" the call, it may or may not be the device that was originally called. Accordingly, the femtocell connects the answering device to the network and facilitates the call such that, to the network, it appears that the called device has been connected.

Figure 1:
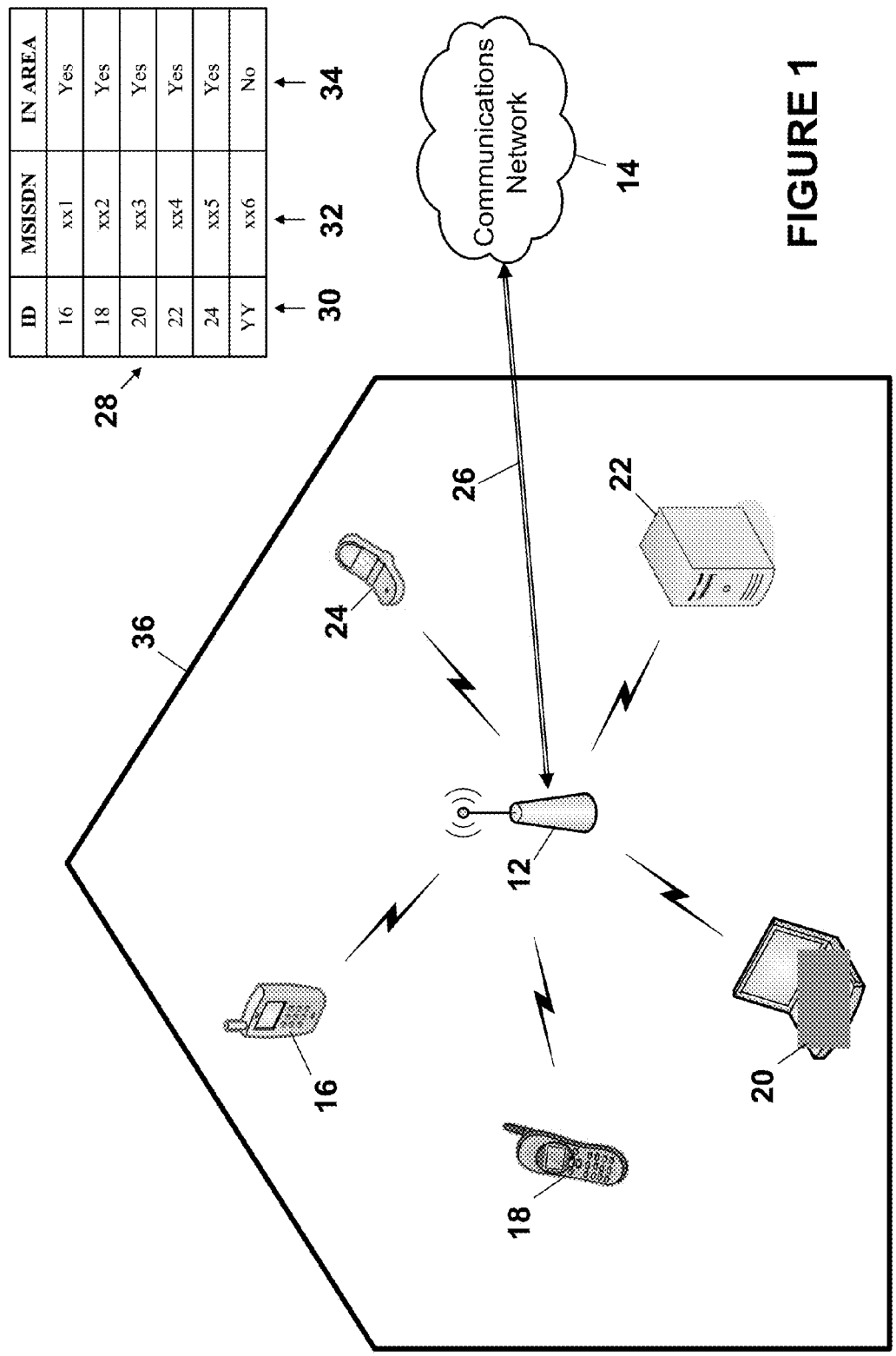
FIG. 1 is an illustration of an example femtocell in communications with a communications network and example communications devices.

FIG. 1 is an illustration of an example femtocell 12 in communications with a communications network 14 and example communications devices 16, 18, 20, 22, and 24. The femtocell 12 can comprise any appropriate femtocell. In an example configuration, the femtocell 12 is a portable device that can be deployed in various locations. The femtocell 12 communicates with the devices 16, 18, 20, 22, 24, via a wireless interface. Any appropriate wireless interface can be utilized for communications between the femtocell 12 and the devices 16, 18, 20, 22, 24. For example, the wireless link can be in accordance with the following protocols: GSM, CDMA, WIMAX, WIFI, ZIGBEE, or a combination thereof. Example power output of the femtocell 12 can be from 0.5 to 0.1 Watts. The femtocell 12 is coupled to the communications network 14 via interface 26. The interface 26 can comprise any appropriate interface, such as, for example, an IP packet data interface (e.g., the Internet).

Communications devices 16, 18, 20, 22, 24, represent any appropriate type and number of communications devices configured to communicate with the femtocell 12. A communications device can comprise a mobile device or a stationary device. A communications device, can include, for example, a portable media player, a portable music player, such as an MP3 player, a walkman, a portable computing device, such as a laptop, a personal digital assistant ("PDA"), a portable phone, such as a cell phone or the like, a smart phone, a Session Initiation Protocol (SIP) phone, a video phone, a portable email device, a portable gaming device, a consumer electronic device, such as a TV, a DVD player, a set top box, a navigation device and/or a non-conventional computing device, such as a kitchen appliance, or a combination thereof.

As communications devices enter and exit the area of coverage (depicted by the building outline 36) of the femtocell 12, the femtocell 12 maintains information about the communications devices, as depicted in example table 28. When a communications device enters the area of coverage 36 of the femtocell 12, the communications device registers with the femtocell 12. In an example embodiment, the femtocell 12 obtains information about the communications device, such as the communications device's MSISDN (Mobile Subscriber Integrated Services Digital Network Number), as shown in column 32 of the table 28. The femtocell 12 can use a device's MSISDN as an identifier, or can assign an identifier to a device, such as shown in column 30 of the table 28. Also as depicted in the table 28 in column 34, the femtocell 12 maintains an indication as to whether a device is within its area of coverage. Thus, as a device exits the area of coverage 36 of the femtocell 12, this is recorded in the table 28 in column 34. The femtocell 12 can maintain information about a device after it exits its area of coverage or the femtocell 12 can delete all information about a device after is exits its area of coverage.

When a call comes in, via the communication network 14 for example, for a communications device within the area of coverage 36 of the femtocell 12, in an example embodiment, all communications devices 16, 18, 20, 22, 24 are rung. That is, all communications devices 16, 18, 20, 22, 24 are provided an indication of the call by the femtocell 12. The femtocell 12 connects the call to the device that answers first. The femtocell 12 facilitates the call such that the network 14 perceives the answering device to be the called device. In an example embodiment, this is accomplished by utilizing the information (e.g., the MSISDNs) obtained from the devices by the femtocell 12. In an example embodiment, the femtocell 12 simulates a call flow as being from the device that was called by transcoding the actual call flow into a spoofed call flow. The spoofed call flow mirrors the call flow as though it were with the called device. In another example embodiment, the femtocell activates a call transfer of the call to the number of the answering device. For example, if a call comes in for communications device 24, the femtocell 12 will ring all communications devices 16, 18, 20, 22, and 24. In this example, if the user answers the call on communications device 18, the femtocell 12 will connect the call to the communications device 18, and provide information to the network 14 indicating that communications device 24 has answered the call.

Figure 2:
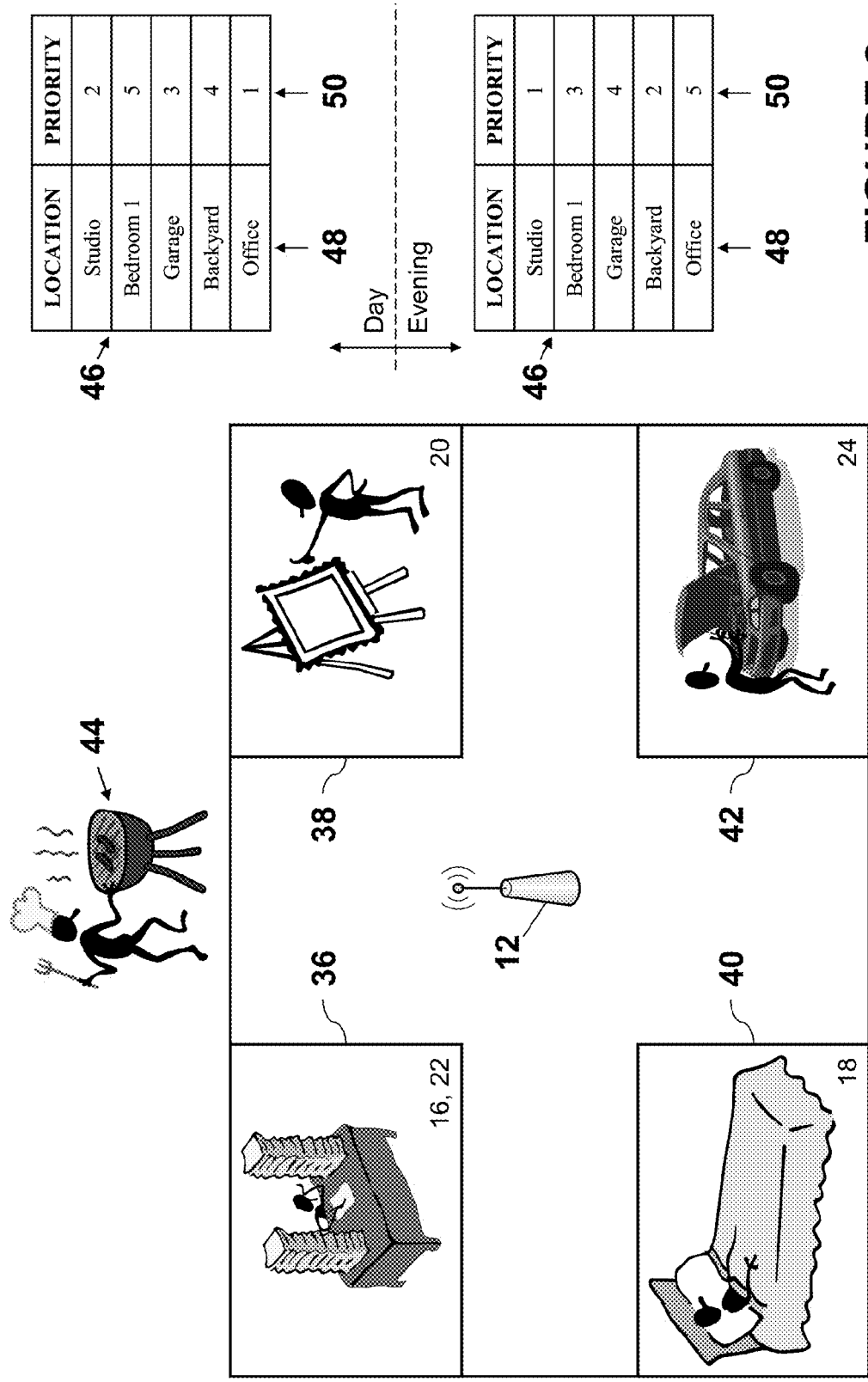
FIG. 2 depicts ringing communications devices in accordance with the locations of the communications devices and priorities of the locations.

Rather than ringing all communications devices concurrently, communications devices can be rung in a desired order. In an example embodiment, communications devices are rung in an order determined by the location of the device and a priority of the location. FIG. 2 depicts ringing communications devices in accordance with the locations of the communications devices and priorities of the locations. As shown in FIG. 2, example zones within the area of coverage of the femtocell 12 include an office 36, a studio 38, a bedroom 40, a garage 42, and a backyard 44. In the example scenario depicted in FIG. 2, during the day, the user is most likely to be, in ascending priority order, in his office 36, his studio 38, his garage 42, his backyard 4, and his bedroom. During the evening, the user will most likely be in other zones of home in a different priority order. For example, as depicted in FIG. 2, during the evening, the user is most likely to be, in ascending priority order, in his studio 38, his backyard 44, his bedroom 3, his garage 42, and his office 36. When a call comes in for a communications device within the area of coverage of the femtocell 12, in an example embodiment, the time of day is determined, the location of the communications devices are determined, the priority of the locations is determined, and the devices in the highest priority location are rung first, the communications devices in the next lower priority location rung next, etc.

In an example scenario, using the designations of FIG. 1 for the communications devices, as shown in FIG. 2, communications devices 16 and 22 are located in the office 36, communications device 20 is located in the studio 38, communications device 18 is located in the bedroom 40, and communications device 24 is located in the garage 42. No communications devices are located in the backyard 44. In this example scenario, day is considered to be between the hours of 8:00 AM and 6:00 PM, and evening is considered to be between the hours of 6:00 PM and 8:00 AM; and it is now 4:00 PM. If a call comes in for any communications device within the area of coverage of the femtocell 12, the femtocell 12 will determine the time (4:00 PM=Day), will determine the priority table to use (upper table in FIG. 2), determine the priority of designated locations, and determine the location of the communications devices within its area of coverage. In this example scenario, because the user is most likely to be in his office 36 (has #1 priority), communications devices 16 and 22 are rung first. If the call is not answered by communications device 16 or 22 (within any appropriate number of rings), communications devices in the next lower priority location are rung. In this scenario, because the studio 38 is the location having the next lower priority, communications device 20 is rung. If the call is not answered by communications device 20, communications device 24 is rung next because it is located in the next lower priority location having a communications device located therein (the garage 42=priority #3). Finally, if the call is not answered by communications device 24, communications device 18 is rung because it is located in the next lower priority location having a communications device located therein (the bedroom 40=priority #5). At this point, the call can be handled in any appropriate manner, such as, for example, transferred to voice mail or dropped. If a communications device(s) cannot be located and the femtocell knows that the communications device(s) is in its area of coverage, the communications device(s) can be rung last.

Communications devices can be located in any appropriate manner. For example, communications devices can be located via GPS (Global Positioning System), A-GPS (Assisted Global Positioning System), time difference of arrival calculations, time of arrival calculations, angle of arrival calculations, via user entered information, or any combination thereof. If a communications device is configured with a GPS receiver, the communications device can provide information to the femtocell 12 pertaining to its location as determined by the GPS. The femtocell 12 can receive information pertaining to the location of a device via A-GPS. In an example embodiment, a user can walk through his/her house and provide location information or specific spots (e.g., waypoints) to the femtocell 12. For example, the user can stand at the center of the living room and provide location information to the femtocell, such as an X/Y coordinate, a lat/long value, or the like. The femtocell could prompt the user to provide information as to the name of the room and use this located a device. For example, the user could stand in the middle of the living room and send a signal (e.g., via a mobile communications device) to the femtocell indicating that the user want to register a waypoint (name a location). The femtocell, upon receiving signal and noting the location, can send a prompt to the user asking for the name of the location, e.g., living room. Subsequently, when the femtocell 12 detects a device in proximity to the registered waypoint, the femtocell determines that the device is in the living room.

In an example embodiment, the femtocell 12 can determine the location of a communications device via various calculation techniques. For example, the femtocell 12 can send a signal to all communications device within its area of coverage, and measure the time of response from each communications device. This information can be used to locate a device via time difference of arrival calculations and/or time of arrival calculations. If the femtocell has directional capability and can measure the angle of arrival of a response from each communications device, the femtocell 12 can determine the location of each communications device via angle of arrival calculations. Locations of designated areas can be provided to the femtocell 12 in any appropriate manner. For example, a user could enter coordinates of designated areas (e.g., perimeter of office 36, etc.), a designated area could be registered with the femtocell 12 by the user walking the perimeter of an area with a transponder, communications device, or the like, that provide location information to the femtocell 12.

In another example embodiment, the first communications device to be rung by the femtocell is the communications device that most recently was moved and/or was active. As a communications device is moved, sensors on the communications device detect the motion. Sensors can include motion sensors, tilt sensors, accelerometers, a camera, etc., for example. The communications device provides an indication, to the femtocell, that the device was moved and the time it was moved. The femtocell stores this information. When a call is received, the femtocell accesses its storage to determine the communications device that was most recently moved, and rings that device first. If the call is not answered within any appropriate number of rings, the femtocell can concurrently ring all remaining communications devices within its area of coverage or ring the communications devices in a predetermined and/or priority order as described above. Similarly, the communications device that was most recently active can be rung first. This can be implemented for communications devices that do not have the ability to sense motion. Activity can include sending a call and/or receiving a call. A call can include voice data, audio data, a text message, an image, video, multimedia, steaming data, connecting to a network (e.g., the Internet), or any combination thereof.

Figure 3:
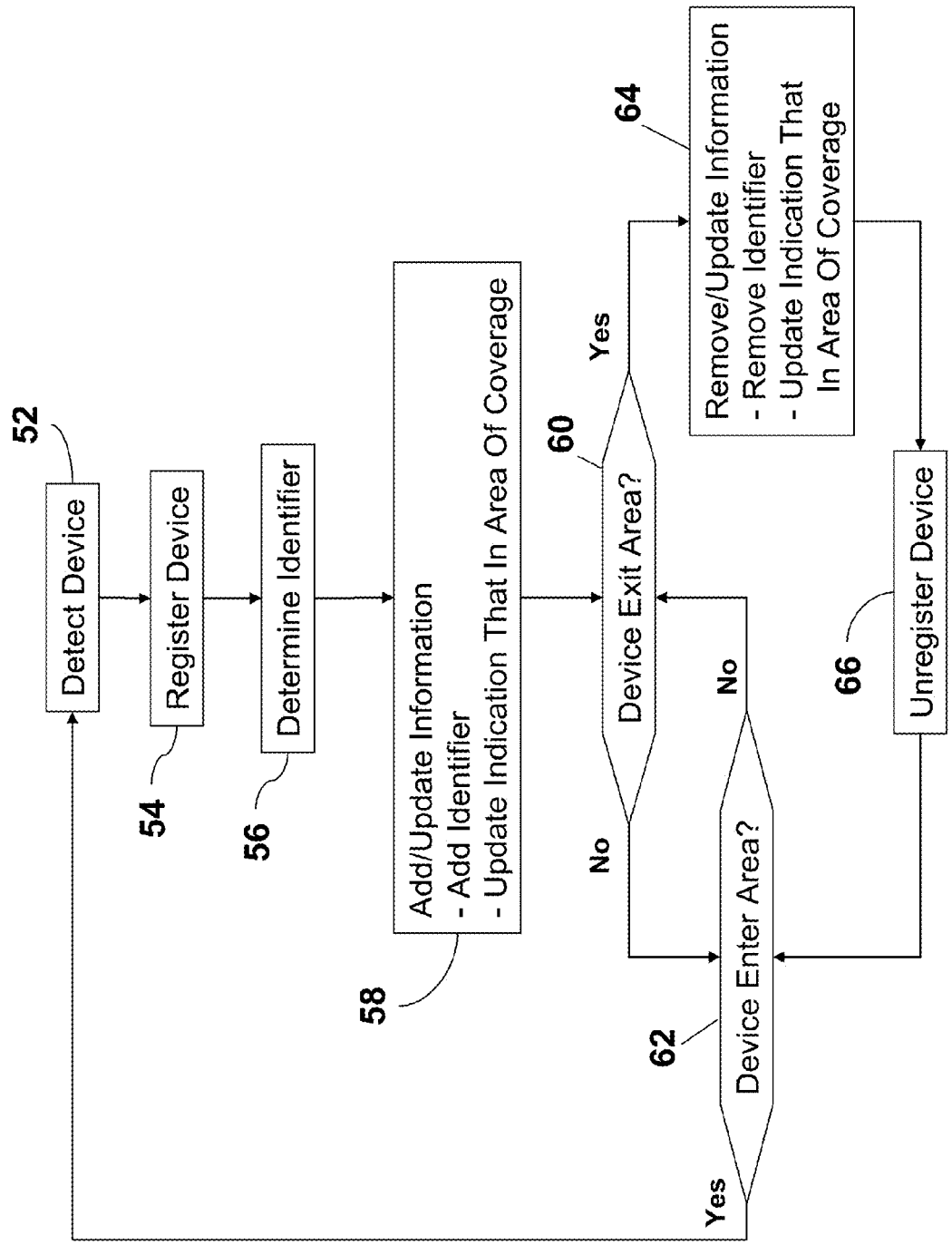
FIG. 3 is a flow diagram of an example process for maintaining information pertaining to communications devices.

FIG. 3 is a flow diagram of an example process for maintaining information pertaining to communications devices via a femtocell. As a communications device enters an area of coverage of a femtocell, the communications device is detected at step 52. The communications device can be detected by the femtocell in any appropriate manner. For example, the communications device initiates detection by sending a signal to the femtocell or the femtocell can initiate the detection. A device can rescan for better coverage during a call or while idle. Upon detection of a better/stronger signal (e.g., from the femtocell), the device will perform a cell site handover to the femtocell. The rescan can occur when the network coverage starts to drop below a predetermined level, and/or when the stronger femtocell signal is detected. The communications device registers with the femtocell at step 54. Registration includes the femtocell receiving information about the communications device in order to allow the femtocell and the communications device to communicate therebetween. An identifier for the communications device is determined at step 56. The identifier can be an identifier generated by the femtocell, an identifier provided by the communications device (e.g., MSISDN of the communications device), or a combination thereof. The identifier of the communications device is maintained by the femtocell. Information pertaining to the communications device is added and/or updated at step 58. In an example embodiment, the identifier of the communications device is added, at step 58, to a list, or the like, that is stored on the femtocell. Also at step 58, the information maintained by the femtocell can be updated to indicate that the communications device is within the femtocell's area of coverage (as depicted in table 28 of FIG. 1, for example). As a communications device exit the area of coverage of the femtocell, the communications device exit is detected at step 60. In an example embodiment, once a communications device is registered with a femtocell, the femtocell and the communications device communicate routinely with each other. When the femtocell does not receive a routine communication from the communications device, the femtocell determines that the communications device is no longer in its area of converge.

If it is detected, at step 60, that a communications device has exited the area of coverage of the femtocell, information pertaining to the communications device is removed and/or updated at step 64. The identifier, or identifiers, associated with the exiting communications device can be removed. In an example embodiment, identification information is not removed when a communications device exits the area of coverage of the femtocell. Thus, when the communications device next enters the area of coverage of the femtocell, the same identification information can be used. Also at step 64, information maintained by the femtocell can be updated to indicate that the communications device is not within the femtocell's area of coverage (as depicted in table 28 of FIG. 1, for example). If needed, he exiting communications device is unregistered from the femtocell at step 66.

In an example embodiment, the femtocell monitors for communications devices entering and exiting its area of coverage as depicted by steps 60 and 62. If a device is detected, at step 62, entering the area of coverage of the femtocell, the process moves to step 52 and proceeds therefrom as described above. And, if a communications device is detected, at step 60, exiting the area of coverage of the femtocell, the process moves to step 64 and proceeds therefrom as described above.

Figure 4:
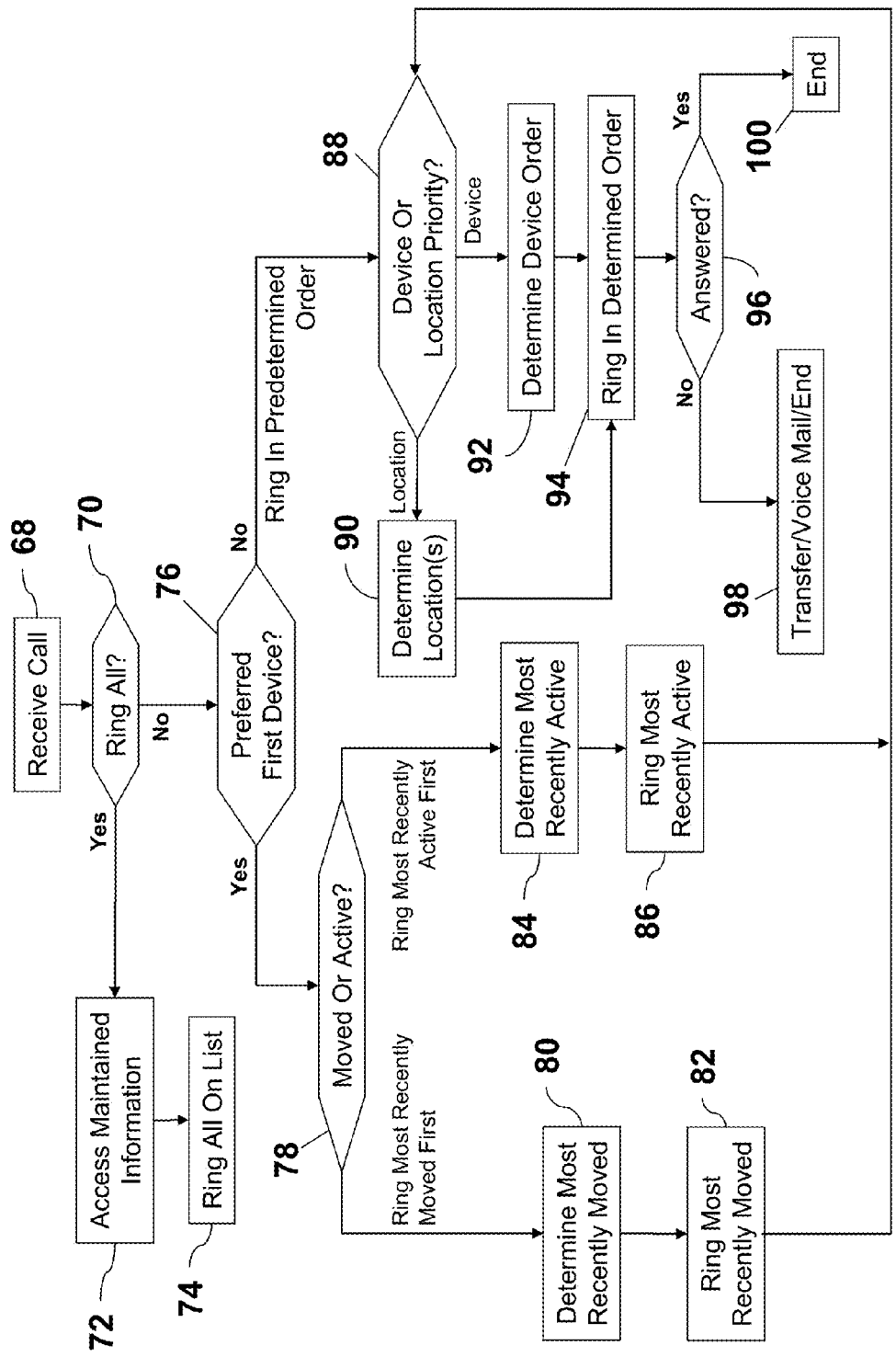
FIG. 4 is a flow diagram of an example process for providing an indication of a call to a communications device in an area of coverage of a femtocell.

FIG. 4 is a flow diagram of an example process for providing an indication of a call to a communications device in an area of coverage of a femtocell. A call is received for one of the communications devices in the area of coverage of the femtocell at step 68. At step 70, it is determined if all communications devices in the area of coverage of the femtocell are to be provided an indication of the call. The decision to provide an indication of the call to all communications devices in the area of coverage of the femtocell (ring all) can be determined in any appropriate manner. As described above, the decision to ring all can be determined in accordance with information stored in the femtocell that is indicative of a user's preferences. Thus, a user can preprogram the femtocell to ring all communications devices within its area of coverage when a call comes in for any one of the communications devices. If it is decided, at step 70, to ring all communications device within the area of coverage of the femtocell, information that is maintained by the femtocell pertaining to the communications devices within the area of coverage of the femtocell is accessed at step 72. For example, the MSISDN, or appropriate number to call for each communications device is accessed. All communications device within the area of coverage of the femtocell are rung at step 74. That is, an indication of the call is provided to all communications devices within the area of coverage of the femtocell. The indication of the call can be provided in any appropriate manner, such as, for example, providing an audible indication, providing a mechanical indication (vibration), providing a visual indication, providing an olfactory indications (e.g., activating chemicals stored on a communications device to provide an odor), or any combination thereof.

If, at step 70, if it is decided not to provide an indication of the call to all communications devices within the area of coverage of the femtocell, then the communications devices within the area of coverage of the femtocell are provided the notification of the call in a predetermined order. At step 76, it is determined if a preferred communications device is to be provided the indication of the call first. If a communications device is preferred to be rung first (step 76), it is determined, at step 78, if the most recently moved communications device is to be rung first or if the communications device with the most recent activity is to be rung first. If the most recently moved communications device is to be rung first, the communications device that was most recently moved is determined at step 80. This can be determined in any appropriate manner, for example, when a communications device is moved, a sensor, or sensors, on the device can detect the motion, and the communications device can provide an indication, to the femtocell, that the communications device has been moved and the time of the movement. In another example embodiment, the communication device can send an indication that it has been moved, and the femtocell can record a time associated with receipt of the indication. Example sensors include a motion sensor, a tilt sensor, an accelerometer, and a camera. The communications device that was most recently moved is provided an indication of the call at step 82. If the call is not answered, the process proceeds to step 88 to ring the communications devices within the area of coverage of the femtocell in a predetermined order. In an example embodiment, the communications device that most recently moved is not rung again, because it was already rung and not answered.

At step 78, if it is determined, that the most recently active communications device is to be rung first, the communications device that was most recently active is determined at step 84. This can be implemented for communications devices that do not have the ability to sense motion, although it is not limited thereto. Activity can include sending a call and/or receiving a call. A call can include voice data, audio data, a text message, an image, video, multimedia, steaming data, connecting to a network (e.g., the Internet), or any combination thereof. In an example embodiment, when activity on the communication device ends, the femtocell can record the time associated with the end of the activity. The femtocell can check the stored information to determine the communications device that was most recently active. The communications device that was most recently active is provided an indication of the call at step 86 (rung first). If the call is not answered, the process proceeds to step 88 to ring the communications devices within the area of coverage of the femtocell in a predetermined order. In an example embodiment, the communications device that was most recently active is not rung again, because it was already rung and not answered.

At step 76, if the most recently moved or most recently active device is not preferred to be rung first, the process proceed to step 88, where it is determined if the communications devices within the area of coverage of the femtocell to be rung in a predetermined order should be rung in priority of location or priority of device. If the communications devices are to be rung in priority of location, at step 90, the location or each communications device within the area of coverage of the femtocell is determined. As described above, the location of each communications device can be determine in any appropriate manner, such as, for example, via GPS, A-GPS, time difference of arrival calculations, time of arrival calculations, angle of arrival calculations, via user entered information, or any combination thereof. Upon determining the location of each communications device within the area of coverage of the femtocell, the communications devices are rung in location-priority order at step 94.

If, at step 88, it is determined that the communications devices within the area of coverage of the femtocell are to be rung in priority of device, at step 92, the device priority is determined. As described above, communications devices can be assigned a priority value. Upon determining the priority value of each communications device within the area of coverage of the femtocell, the communications devices are rung in device-priority order at step 94.

When a communications device answers, at step 96, the process ends at step 100. If the communications devices being rung is not answered, the process continues ringing all communications devices (at step 94) within the area of coverage of the femtocell until all communications devices have been rung. If not communications device answers, at step 98, the process can end, the call can be sent to voice mail, and/or the call can be transferred, or the like.

Figure 5:
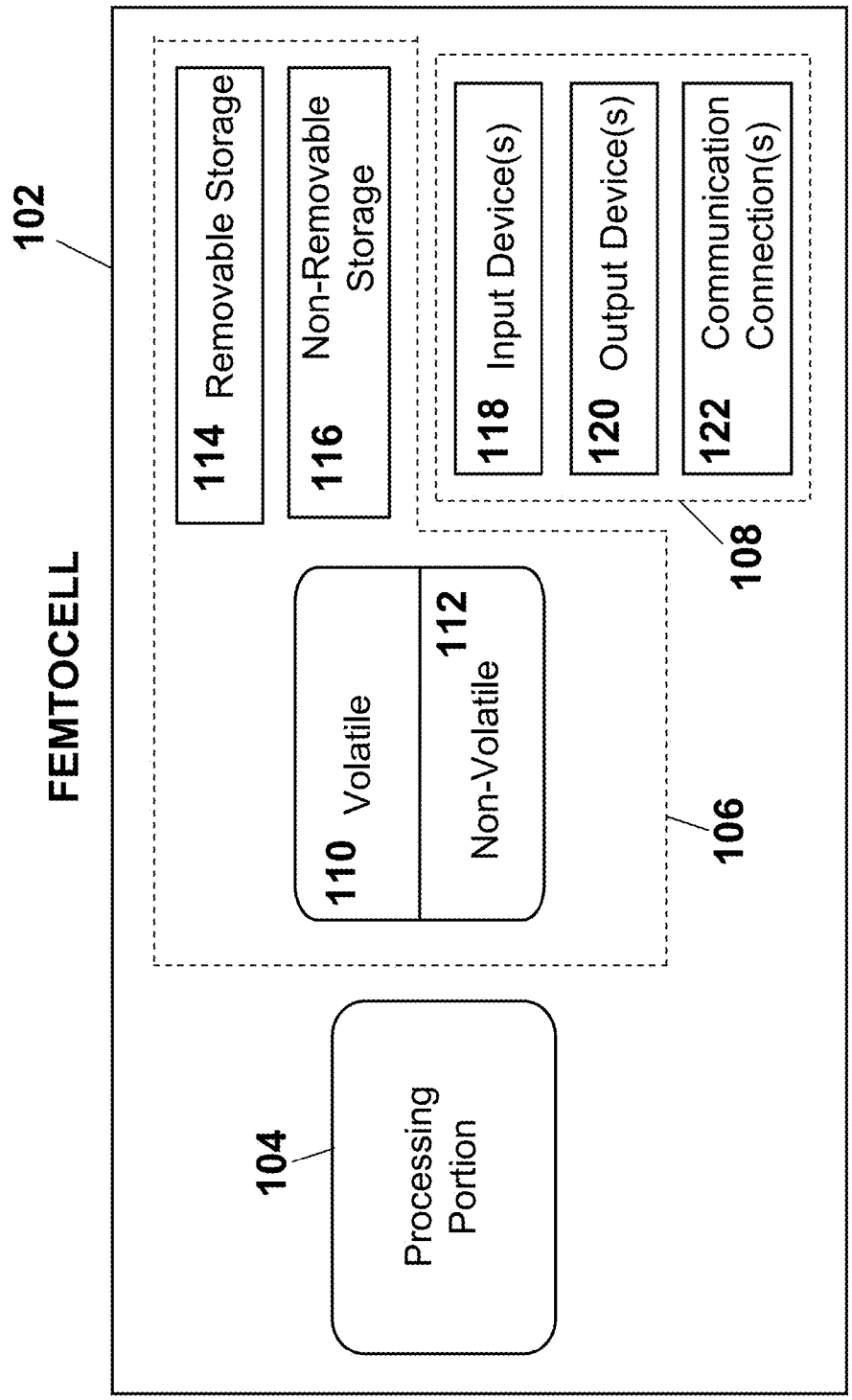
FIG. 5 is a functional block diagram of an example femtocell.

FIG. 5 is a functional block diagram of an example femtocell 102. It is emphasized that the block diagram depicted in FIG. 5 is exemplary and not intended to imply a specific implementation or configuration. Accordingly, the femtocell 102 can be implemented in a single processor or multiple processors. Multiple processors can be distributed or centrally located. Multiple processors can communicate wirelessly, via hard wire, or a combination thereof.

In an example configuration, the s femtocell 102 comprises a processing portion 104, a memory portion 106, and an input/output portion 108. The processing portion 104, memory portion 106, and input/output portion 108 are coupled together (coupling not shown in FIG. 5) to allow communications therebetween. The input/output portion 108 is capable of receiving and/or providing information from/to a communications device. For example, the input/output portion 106 is capable of providing a call to all communications devices within an area of coverage of the femtocell, providing a call to communications devices in a predetermined order, providing a call to a communications device that was most recently moved, providing a call to a communications device that was most recently active, receiving an indication of motion from a communications device, receiving a call from a communications device, or any combination thereof, as described above. In various configurations, the input/output portion 108 can receive and/or provide information via any appropriate means, such as, for example, optical means (e.g., infrared), electromagnetic means (e.g., GSM, CDMA, RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 108 can receive and/or provide information wirelessly, via a wired connection, or a combination thereof.

The processing portion 104 is capable of performing functions associated with communicating with communications devices within an area of coverage of the femtocell 102. For example, as described above, the processing portion 104 is capable of detecting a communications device, registering a communications device, adding information stored in the femtocell, removing information stored in the femtocell, updating information stored in the femtocell, determining if a communications device has exited the femtocell's area of coverage, unregistering a communications device, determining the most recently moved communications device, determining the most recently active communications device, determining a location of a communications device, determining a location-priority, determining a device-priority, transferring a call, sending a call to voice mail, assigning an identifier to a communications device, or any combination thereof.

The memory portion 106 can store any information utilized in conjunction with communicating with communications devices within an area of coverage of the femtocell 102. For example, as described above, the memory portion 106 is capable of storing an identifier of a communications device (e.g., MSISDN), information pertaining to whether a communications device is within the area of coverage or not within the area of coverage of the femtocell 102, the location of a communications device, the priority value assigned to a location, the priority value assigned to a communications device, time, or a combination thereof. Depending upon the exact configuration and type of femtocell, the memory portion 106 can include computer readable storage media that is volatile 110 (such as dynamic RAM), non-volatile 112 (such as ROM), or a combination thereof. The femtocell 102 can include additional storage, in the form of computer readable storage media (e.g., removable storage 114 and/or non-removable storage 116) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the femtocell 102.

The femtocell 102 also can contain communications connection(s) 122 that allow the femtocell 102 to communicate with other devices, femtocells, or the like. A communications connection(s) can comprise communication media. Computer readable communication media typically embody computer readable instructions, data structures, program modules or other data, that can be transported via a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The femtocell 102 also can include input device(s) 118 such as keyboard, mouse, pen, voice input device, touch input device, etc. Output device(s) 120 such as a display, speakers, printer, etc. also can be included.

While example embodiments of femtocell call management have been described in connection with various computing devices/processor, the underlying concepts can be applied to any computing device, processor, or system capable of utilizing and/or implementing femtocell call management. The various techniques described herein can be implemented in connection with hardware or software or, where appropriate, with a combination of both. Thus, the methods and apparatuses for the utilization of femtocell call management, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for the utilization of femtocell call management. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for femtocell call management also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of femtocell call management. When implemented on a general-purpose processor, the program code combines with the processor to provide a unique apparatus that operates to invoke the functionality of femtocell call management. Additionally, any storage techniques used in connection with the utilization of femtocell call management can invariably be a combination of hardware and software.

While femtocell call management has been described in connection with the various embodiments of the various figures, it is to be understood that other similar embodiments can be used or modifications and additions can be made to the described embodiment for performing the same function of femtocell call management without deviating therefrom. For example, one skilled in the art will recognize that femtocell call management as described in the present application may apply to any environment, whether wired or wireless, and may be applied to any number of such devices connected via a communications network and interacting across the network. Therefore, femtocell call management should not be limited to any single embodiment, but rather should be construed in breadth and scope in accordance with the appended claims.

What is claimed:

1. A method comprising:
   detecting, within an area of coverage of a wireless network, a plurality of user mobile devices connected to the wireless network, the plurality of detected user mobile devices including a designated device;
   defining at least a first zone and a second zone within the area of coverage, wherein the first zone does not overlap with the second zone and boundaries of the first zone and second zone are independent of locations of the plurality of user devices;
   receiving a call for the designated device;
   determining in which zone, of the at least first zone and the second zone, each of the detected user mobile devices is located;
   assigning a respective zone priority value to each of the at least first zone and the second zone, the respective zone priority value assigned to each of the at least first zone and the second zone differing depending upon a time of day;
   providing an indication of the call to the detected user mobile devices located within the the first zone; and
   if none of the detected user mobile devices within the first zone answers the call after a predetermined period, providing a second indication of the call to the detected user mobile devices located within the second zone;
   wherein the zone priority value of the first zone is greater than the zone priority value of the second zone.

2. The method of claim 1, further comprising connecting the call to a detected user mobile device of the plurality of detected user mobile devices that first answers the call.

3. The method of claim 1, further comprising connecting the call to the designated device when no device answers the call.

4. The method of claim 1, further comprising:
   maintaining a plurality of specific identifiers, each specific identifier of the plurality of identifiers being an identifier of a respective one of the plurality of detected user mobile devices; and
   providing, via respective specific identifiers, the indication of the call to the plurality of detected user mobile devices.

5. The method of claim 4, further comprising:
   adding to a list of the plurality of specific identifiers, a specific identifier of a device upon entering the area of coverage; and
   removing from the list a specific identifier of a second device upon exiting the area of coverage.

6. The method of claim 4, wherein a specific identifier is indicative of a Mobile Subscriber Integrated Services Digital Network Number of a respective device.

7. The method of claim 1, further comprising upon connecting the call to a selected one of the plurality of detected user mobile devices that differs from the designated one of the plurality of detected user mobile devices, facilitating communications to provide an appearance that the call is connected to the designated one of the plurality of detected user mobile devices.

8. An apparatus comprising:
   a processor; and
   memory coupled to the processor, the memory comprising executable instructions that when executed by the processor cause the processor to effectuate operations comprising:
   detecting, within an area of coverage of a wireless network, a plurality user mobile devices connected to the wireless network, the plurality of user mobile devices including a designated device;
   defining at least a first zone and a second zone within the area of coverage, wherein the first zone does not overlap with the second zone and boundaries of the first zone and second zone are independent of locations of the plurality of user devices;
   receiving a call for the designated device;
   determining in which zone, of the at least first zone and the second zone, each of the plurality of user mobile devices is located;
   assigning a respective zone priority value to each of the at least first zone and the second, the respective zone priority value assigned to each of the at least first zone and the second zone differing depending upon a time of day;
   providing an indication of the call to the detected user mobile devices located within the first zone; and
   if none of the detected user mobile devices within the first zone answers the call after a predetermined period, providing a second indication of the call to the detected user mobile devices located within the second zone,
   wherein the zone priority value of the first zone is greater than the zone priority value of the second zone.

9. The apparatus of claim 8, the operations further comprising connecting the call to a detected user mobile device of the plurality of detected user mobile devices that first answers the call.

10. The apparatus of claim 8, the operations further comprising connecting the call to the designated device when no device answers the call.

11. The apparatus of claim 8, the operations further comprising:
    maintaining a plurality of specific identifiers, each specific identifier of the plurality of identifiers being an identifier of a respective one of the plurality of detected user mobile devices; and
    providing, via respective specific identifiers, the indication of the call to the plurality of detected user mobile devices.

12. The apparatus of claim 11, the operations further comprising:
    adding to a list of the plurality of specific identifiers, a specific identifier of a device upon entering the area of coverage; and
    removing from the list a specific identifier of a second device upon exiting the area of coverage.

13. The apparatus of claim 11, wherein a specific identifier is indicative of a Mobile Subscriber Integrated Services Digital Network Number of a respective device.

14. The apparatus of claim 8, the operations further comprising:
    upon connecting the call to a selected one of the plurality of detected user mobile devices that differs from the designated one, facilitating communications to provide an appearance that the call is connected to the designated one.

15. A computer-readable storage medium that is not a propagating signal, the computer-readable storage medium comprising executable instructions that when executed by a processor cause the processor to effectuate operations comprising:
- detecting, within an area of coverage of a wireless network, a plurality of user mobile devices connected to the wireless network, the plurality of detected user mobile devices including a designated device;
- defining at least a first zone and a second zone within the area of coverage, wherein the first zone does not overlap with the second zone and boundaries of the first zone and second zone are independent of locations of the plurality of user devices;
- receiving a call for the designated device;
- determining in which zone, of the at least first zone and the second zone, each of the detected user mobile devices is located;
- assigning a respective zone priority value to each of the at least first zone and second zone, the respective zone priority value assigned to at least the first zone and the second zone differing depending upon a time of day;
- providing an indication of the call to the detected user mobile devices located within the first zone; and
- if none of the detected user mobile devices within the first zone answers the call after a predetermined period, providing a second indication of the call to the detected user mobile devices located within the second zone,
- wherein the zone priority value of the first zone is greater than the zone priority value of the second zone.

16. The computer-readable storage medium of claim 15, the operations further comprising connecting the call to a detected user mobile device of the plurality of detected user mobile devices that first answers the call.

17. The computer-readable storage medium of claim 15, the operations further comprising connecting the call to the designated device when no device answers the call.

18. The computer-readable storage medium of claim 15, the operations further comprising:
- maintaining a plurality of specific identifiers, each specific identifier of the plurality of identifiers being an identifier of a respective one of the plurality of detected user mobile devices; and
- providing, via respective specific identifiers, the indication of the call to the plurality of detected user mobile devices.

19. The computer-readable storage medium of claim 18, the operations further comprising:
- adding to a list of the plurality of specific identifiers, a specific identifier of a device upon entering the area of coverage; and
- removing from the list a specific identifier of a second device upon exiting the area of coverage.

20. The computer-readable storage medium of claim 15, the operations further comprising:
- upon connected the call to a selected one of the plurality of detected user mobile devices that differs from the designated one, facilitating communications to provide an appearance that the call is connected to the designated one.

* * * * *